United States Patent [19]

Ito et al.

[11] Patent Number: 4,574,423
[45] Date of Patent: Mar. 11, 1986

[54] ROTARY DAMPER HAVING A CLUTCH SPRING AND VISCOUS FLUID

[75] Inventors: Kenji Ito, Tochigi; Masanori Watanabe, Toga, both of Japan

[73] Assignee: Fuji Seiki Kabushiki Kaisha, Japan

[21] Appl. No.: 577,007

[22] Filed: Feb. 6, 1984

[30] Foreign Application Priority Data

Feb. 9, 1983 [JP] Japan .................................. 58-16727

[51] Int. Cl.⁴ ................................................ E05F 5/08
[52] U.S. Cl. ............................................ 16/85; 16/342; 188/82.1; 188/271; 188/291
[58] Field of Search .................... 16/49, 51, 52, 82, 85, 16/86 R, 86 A, 337, 342, 347; 188/82.1, 271, 290, 291

[56] References Cited

U.S. PATENT DOCUMENTS

| | | | |
|---|---|---|---|
| 2,173,126 | 9/1939 | Moore | 188/82.1 X |
| 3,038,195 | 6/1962 | Bardfeld | 188/82.1 X |
| 3,160,911 | 12/1964 | Morris et al. | 188/291 X |
| 4,191,096 | 3/1980 | Benjamin | 188/291 X |
| 4,342,135 | 8/1982 | Matsuo et al. | 16/82 |

FOREIGN PATENT DOCUMENTS 3029243 3/1982 Fed. Rep. of Germany ........ 16/337
57-63842 11/1983 Japan .

Primary Examiner—Fred Silverberg
Attorney, Agent, or Firm—Steinberg & Raskin

[57] ABSTRACT

A rotary damper with a directional property is disclosed which is capable of being simplified in structure, manufactured with a low cost, and stably and precisely operated. The rotary damper is constructed in such a manner that a clutch spring is interposed between a revolving shaft and a rotor to selectively carry out the integral rotation of the rotor with the shaft or the stop of the rotor independent from the shaft.

1 Claim, 3 Drawing Figures

ROTARY DAMPER HAVING A CLUTCH SPRING AND VISCOUS FLUID

BACKGROUND OF THE INVENTION

This invention relates to a rotary damper with a directional property, and more particularly to a rotary damper adapted to exert a turning force varied in magnitude depending upon the direction of rotation.

Recently, a rotary damper has been extensively used for, in particular, a cassette tape ejecting mechanism in a cassette tape recorder, a video tape recorder (VTR) or the like, because it allows a cassette holder actuating operation to be gracefully and smoothly carried out and effectively prevents the generation of an impact noise and a vibration. Particularly, even when a mechanism to be subjected to a damping operation exhibits a linear motion or a motion similar thereto, the rotary damper can readily convert such motion into a rotary motion. Thus, it is considered in the art that the rotary damper has a significant advantage over a linear damper.

One of conventional rotary dampers of such type is disclosed in Japanese Utility Model Application Laid-Open Publication No. 58-167351 (Japanese Patent Application No. 57-63842). The conventional rotary damper is constructed by providing a non-directional rotary damper with a one way clutch mechanism. However, it is apt to break down because of its complicated structure and the use of many parts. Also, the conventional rotary damper has another disadvantage that it is difficult to accomplish a precise and stable clutch operation because the angle of rotation required to actuate the one way clutch is 30 to 50 degree or more. There is known in the art another rotary damper which is constructed to utilize air resistance due to a gear and a windmill. However, the conventional damper is also apt to break down because it is complicated in structure and includes many parts. Also, a further conventional rotary damper is known which is adapted to carry out the actuation of a cassette holder utilizing a motor. However, it is increased in manufacturing cost, so that it is limited to the application to a high-grade apparatus.

SUMMARY OF THE INVENTION

The present invention has been made in view of the foregoing disadvantages of the prior art.

Generally, in accordance with the present invention, a rotary damper with a directional property is provided which is constructed in a manner to interpose a clutch spring between a revolving shaft and a rotor to selectively carry out the integral rotation of the rotor with the shaft or the stop of the rotor independent from the shaft.

In accordance with the present invention, there is provided a rotary damper with a directional property comprising a housing; a rotor rotatably received in said housing; a viscous fluid interposed between said housing and said rotor to apply a viscous resistance to said rotor; a revolving shaft; and a clutch spring mechanism arranged between said revolving shaft and said rotor.

In accordance with a preferred embodiment of the present invention, there is provided a rotary damper with a directional property comprising a housing; a rotor rotatably received in said housing, said rotor having a circular recess formed on the upper surface thereof; a viscous liquid interposed between said housing and said rotor to apply a viscous resistance to said rotor; a revolving shaft having a part thereof rotatably inserted in said recess of said rotor; a clutch spring in the form of a coil spring fitted on said part of said revolving shaft in a manner to be interposed between said rotor and said revolving shaft through said recess and form a frictional contact with said revolving shaft; and a means for securely engaging one end of said clutch spring with one of said revolving shaft and said rotor adjacent to said recess of said rotor.

Further, in accordance with another preferred embodiment of the present invention, there is provided a rotary damper with a directional property comprising a housing; a rotor rotatably received in said housing, said rotor having a circular recess formed on the upper surface thereof; a viscous liquid interposed between the bottom of said housing and the lower surface of said rotor to apply a viscous resistance to said rotor; a revolving shaft having a part thereof rotatably inserted in said recess of said rotor; a clutch spring in the form of a coil spring fitted on said part of said revolving shaft in a manner to be interposed between said rotor and said revolving shaft through said recess and form a frictional contact with said revolving shaft; a cutout formed at said part of said revolving shaft opposite to the upper end of said recess and having one end of said clutch spring securely supported therein; and a friction means arranged between the lower portion of the outer periphery of said rotor and the bottom of said housing.

Accordingly, it is an object of the present invention to provide a rotary damper with a directional property which is capable of being substantially simplified in structure and manufactured with a low cost.

It is another object of the present invention to provide a rotary damper with a directional property which is capable of allowing the actuating angle of a clutch mechanism to be significantly decreased, to thereby be stably and precisely operated.

It is a further object of the present invention to provide a rotary damper with a directional property which is capable of exhibiting a stable viscous resistance.

It is still a further object of the present invention to provide a rotary damper with a directional property which is capable of exhibiting a stable frictional resistance as well as stable viscous resistance.

The invention accordingly comprises the features of construction, the combination of elements, and arrangement of parts which will be exemplified in the constructions hereinafter set forth, and the scope of the invention will be indicated in the appended claims.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a rotary damper with a directional property according to the present invention will be described hereinafter by way of example with reference to the accompanying drawings.

Figure 1:
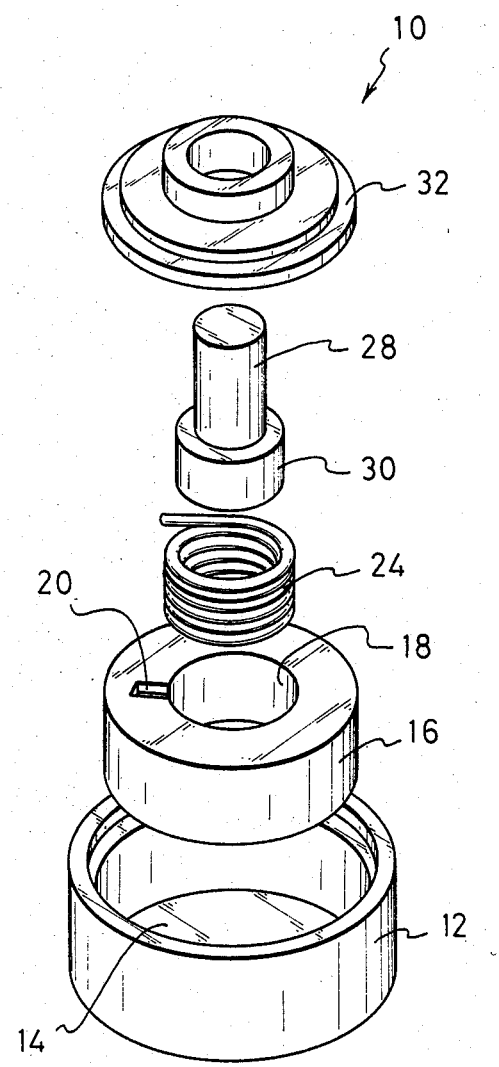
FIG. 1 is an enlarged exploded perspective view showing one embodiment of a rotary damper with a directional property according to the present invention.
Figure 2:
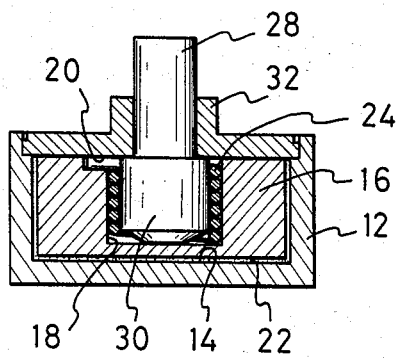
FIG. 2. is a vertical sectional view of the rotary damper shown in FIG. 1.

FIGS. 1 and 2 illustrate one embodiment of a rotary damper with a directional property according to the present invention wherein a damper is generally designated by reference numeral 10. The rotary damper 10 includes a housing 12 formed into a hollow cylindrical shape. The housing 12 is opened at the upper end thereof and has a bottom 14. In the housing 12 is rotatably received a rotor 16 of a flat cylindrical shape, which is formed at the central portion of the upper surface thereof with a cylindrical recess 18 and also formed on the upper surface thereof with a cutout 20 in a manner to communicate with the recess 18. The rotary damper 10 also includes a viscous fluid 22 (FIG. 2) interposed between the lower surface of the rotor 16 and the bottom of the housing 12. In the illustrated embodiment, a viscous liquid such as a silicone oil is used as the fluid 22.

The rotary damper 10 further includes a coil spring 24 loosely fitted in the recess 18 of the rotor 16 to form a gap of a small distance between the inner wall of the rotor 16 defining the recess 18 and the spring 24. The spring 24 is securely inserted at one end thereof in the cutout 20 formed on the upper surface of the rotor 16 to communicate with the recess 18. The damper 10 still further includes a revolving shaft 28 fitted at a part thereof in the coil spring 24 to normally form a frictional contact with the coil spring 24. Thus, it will be noted that the coil spring 24 acts as a clutch spring. In the illustrated embodiment, the shaft portion of a larger diameter designated by reference numeral 30 is fitted in the clutch spring 24. The housing 12 in which the rotor 16, viscous liquid 22, clutch spring 24 and revolving shaft 28 are received is covered with a top closure 32 in such a manner that the shaft 28 upwardly projects from the cover 32.

The manner of operation of the embodiment described above will be described hereinafter with reference to FIG. 2.

First, when the revolving shaft 28 is turned in the clockwise direction, the clutch spring 24 inwardly contracts to compress the clutch portion 30 of the revolving shaft 28 because the frictional contact is formed between the spring 24 and the shaft 28, so that the clutch spring 24 starts to be rotated with the revolving shaft 28. This attempts to allow the rotor 16 in which one end of the spring 24 is held to be rotated together. At this time, the rotor 16 starts to be rotated when a turning force, which is transmitted from the revolving shaft 28 through the frictional and clamping engagement between the clutch portion 30 of the shaft 28 and the clutch spring 24 to the rotor 16, overcomes a viscous resistance applied to the rotor 16 by the viscous liquid 22 interposed between the rotor 16 and the bottom 14 of the housing 12. On the contrary, when the revolving shaft 28 is rotated in the counter-clockwise direction, the clutch spring 24 outwardly expands to cause the frictional engagement between the spring 24 and the shaft 28 to be released, thus, the revolving shaft 28 runs idle.

Figure 3:
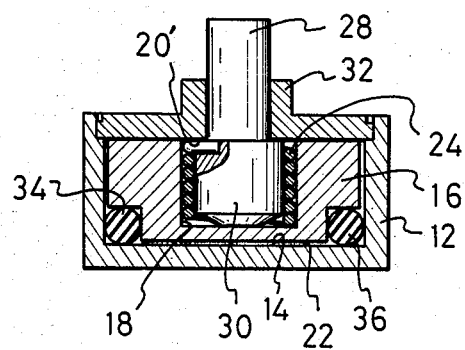
FIG. 3 is a vertical sectional view showing another embodiment of a rotary damper with a directional property according to the present invention.

FIG. 3 shows another embodiment of a rotary damper with a directional property according to the present invention. The rotary damper 10 of the illustrated embodiment includes a housing 12 in the form of a hollow cylinder opened at the upper end thereof and having a bottom 14. The housing 12 has a rotor 16 rotatably received therein which is formed with a cylindrical recess 18 on the upper surface thereof. Between the outer lower surface of the rotor 16 and the bottom 14 of the housing 12 is interposed a viscous liquid 22 such as a silicone oil which acts to apply a frictional resistance to the rotor 16 when it is rotated. In the recess 18 of the rotor 16, a coil spring 24 acting as a clutch spring is loosely fitted to form a gap of a suitable distance between the inner wall of the rotor 16 defining the recess 18 and the spring 24. The damper 10 also includes a revolving shaft 28 which is fitted at a part 30 thereof having a larger diameter in the coil spring 24 to form a frictional contact with the spring 24. The revolving shaft 28 is formed at the upper end of the clutch portion 30 with a cutout 20' in which one end of the clutch spring 24 is securely supported.

In the embodiment shown in FIG. 3, the rotor 16 is formed at the lower end of the outer periphery thereof with an annular cutout 34, in which a friction member 36 such as a rubber ring is received in a manner to contact with the bottom 14 of the housing 12. The housing 12 is covered with a top closure 32.

In the embodiment constructed in the manner as described above, when the revolving shaft 28 is turned in the counter-clockwise direction, the clutch spring 24 outwardly expands to pressedly abut against the inner wall of the rotor 16 defining the recess 18. This allows a turning force to be transmitted from the revolving shaft 28 through the frictional and pressing engagement between the clutch spring 24 and the rotor 16 to the rotor, to thereby try to rotate the rotor 16. At this time, the rotor 16 starts to be rotated when the turning force transmitted thereto overcomes a frictional resistance and a viscous resistance respectively applied thereto from the friction member 36 and the viscous liquid 22. In this instance, it is a matter of course that the frictional and pressing engagement between the clutch spring 24 and the rotor 16 is adapted to allow the damper 10 to exhibit such function. On the contrary, the turning of the revolving shaft 28 in the clockwise direction keeps the clutch opening 24 at a contracted state and does not cause it to engage with the rotor 16, thus, the revolving shaft 28 runs idle.

Thus, it will be noted that the embodiment shown in FIG. 3 is adapted to stably operate regardless of the variation in temperature because it is constructed to utilize a frictional resistance due to the frictional member as well as a viscous resistance of the viscous liquid.

As can be seen from the foregoing, the present invention is constructed to interpose the clutch spring between the revolving shaft and the rotor to selectively carry out the integral rotation of the rotor with the revolving shaft or the stop of the rotor independent from the shaft. Also, the present invention can utilize a stable viscous resistance because the clutch spring also acts to stably force the rotor against the bottom of the housing at a predetermined pressure.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A rotary damper with a directional property, comprising:
   a housing having a bottom;
   a rotor rotatably received in said housing, said rotor having a circular recess formed on the upper surface thereof;
   a viscous liquid interposed between the bottom of said housing and the lower surface of said rotor to apply a viscous resistance to said rotor;
   a revolving shaft having a part thereof rotatably inserted in said recess of said rotor;
   clutch means in the form of a coil spring fitted on said part of said revolving shaft in a manner to be interposed between said rotor and said revolving shaft through said recess and form a frictional contact with said revolving shaft;
   a cutout formed in said part of said revolving shaft opposite to the upper end of said recess and having one end of said clutch spring securely supported therein; and
   friction means comprising a rubber ring interposed between and mutually engaging an annular recess formed at the lower portion of the outer periphery of said rotor and the bottom of said housing.

* * * * *